US010063392B2

(12) United States Patent
Jackson (10) Patent No.: US 10,063,392 B2
(45) Date of Patent: Aug. 28, 2018

(54) METHODS AND APPARATUS TO SELECT A VOICE OVER INTERNET PROTOCOL (VOIP) BORDER ELEMENT (75) Inventor: James Jackson, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2360 days.

(21) Appl. No.: 11/842,720

(22) Filed: Aug. 21, 2007

(65) Prior Publication Data
US 2009/0052434 A1 Feb. 26, 2009

(51) Int. Cl.
H04L 29/08 (2006.01)
H04L 29/06 (2006.01)
H04W 12/06 (2009.01)
H04L 12/66 (2006.01)

(52) U.S. Cl.
CPC .................... H04L 12/66 (2013.01)

(58) Field of Classification Search
CPC ........... H04L 29/12094; H04L 65/1006; H04L 65/1069
See application file for complete search history.

(56) References Cited

U.S. PATENT DOCUMENTS

| 6,426,955 | B1 | 7/2002 | Gossett Dalton, Jr. et al. |
| 6,856,991 | B1 | 2/2005 | Srivastava |
| 6,914,886 | B2 | 7/2005 | Peles et al. |
| 7,047,315 | B1 | 5/2006 | Srivastava |
| 7,088,718 | B1 | 8/2006 | Srivastava |
| 7,145,898 | B1 | 12/2006 | Elliott |
| 7,180,864 | B2 | 2/2007 | Basu et al. |
| 7,180,912 | B1 | 2/2007 | Samarasinghe |
| 7,197,040 | B2 | 3/2007 | Bressoud et al. |
| 7,480,260 | B1 * | 1/2009 | Vashisht et al. ............ 370/260 |
| 7,725,596 | B2 * | 5/2010 | Garcia-Luna-Aceves ............ G06F 12/1483 709/203 |
| 2002/0004846 | A1 * | 1/2002 | Garcia-Luna-Aceves et al. ............ 709/245 |
| 2002/0016860 | A1 * | 2/2002 | Garcia-Luna-Aceves et al. ............ 709/245 |
| 2002/0075881 | A1 * | 6/2002 | Yoakum et al. ............ 370/410 |
| 2003/0079027 | A1 | 4/2003 | Slocombe et al. |
| 2003/0117954 | A1 | 6/2003 | De Neve et al. |
| 2003/0182410 | A1 * | 9/2003 | Balan et al. .................. 709/223 |
| 2003/0200307 | A1 | 10/2003 | Raju et al. |

(Continued)

OTHER PUBLICATIONS

Rosenberg, J., "Requirements for Management of Overload in the Session Initiation Protobol draft-ietf-sipping-overload-reqs-02", IETF draft recommendation, Oct. 2006, 21 pages. URL http://www.tools.ietf.org/html/draft-rosenberg-sipping-overload-reqs-02.

Primary Examiner — Asad Nawaz
Assistant Examiner — Jason Harley
(74) Attorney, Agent, or Firm — Hanley, Flight & Zimmerman, LLC (57) ABSTRACT Methods and apparatus to select a voice over Internet protocol (VoIP) border element are disclosed. An example method comprises sending a first session initiation protocol (SIP) protocol message from a first voice over Internet protocol (VoIP) device, the first SIP message comprising an Internet protocol (IP) address shared by at least two VoIP border elements, and receiving a second SIP message at the first VoIP device from a second VoIP device, the second SIP message comprising a unique address for the second VoIP device, the second VoIP device to be selected based on the shared IP address.

26 Claims, 5 Drawing Sheets

(56) References Cited

U.S. PATENT DOCUMENTS

| | | |
|---|---|---|
| 2004/0146045 A1 | 7/2004 | Jimmei et al. |
| 2004/0210670 A1 | 10/2004 | Anerousis et al. |
| 2005/0010653 A1 | 1/2005 | McCanne |
| 2005/0044141 A1 | 2/2005 | Hameleers et al. |
| 2005/0058125 A1 | 3/2005 | Mutikainen et al. |
| 2005/0083912 A1 | 4/2005 | Afshar et al. |
| 2005/0149531 A1 | 7/2005 | Srivastava et al. |
| 2005/0190746 A1* | 9/2005 | Xiong et al. ............... 370/352 |
| 2005/0223095 A1* | 10/2005 | Volz et al. ............... 709/225 |
| 2006/0003734 A1* | 1/2006 | Vallinen et al. ............... 455/406 |
| 2006/0013147 A1* | 1/2006 | Terpstra et al. ............... 370/252 |
| 2006/0064478 A1 | 3/2006 | Sirkin |
| 2006/0112170 A1 | 5/2006 | Sirkin |
| 2006/0130064 A1 | 6/2006 | Srivastava |
| 2006/0133356 A1* | 6/2006 | Suzukawa ......... H04L 29/06027 370/352 |
| 2006/0146792 A1 | 7/2006 | Ramachandran et al. |
| 2006/0159100 A1 | 7/2006 | Droms et al. |
| 2006/0165064 A1 | 7/2006 | Brown et al. |
| 2006/0190746 A1* | 8/2006 | Boerstler et al. ............. 713/300 |
| 2006/0209851 A1 | 9/2006 | Scudder et al. |
| 2006/0233155 A1 | 10/2006 | Srivastava |
| 2006/0233158 A1 | 10/2006 | Croak et al. |
| 2006/0233159 A1 | 10/2006 | Croak et al. |
| 2006/0291450 A1 | 12/2006 | Ramachandran et al. |
| 2007/0019619 A1 | 1/2007 | Foster et al. |
| 2007/0019623 A1 | 1/2007 | Alt et al. |
| 2007/0019625 A1 | 1/2007 | Ramachandran et al. |
| 2007/0022479 A1* | 1/2007 | Sikdar et al. ............... 726/22 |
| 2007/0025279 A1* | 2/2007 | Baek et al. ............... 370/260 |
| 2007/0036143 A1 | 2/2007 | Alt et al. |
| 2007/0036151 A1 | 2/2007 | Baeder |
| 2007/0047446 A1 | 3/2007 | Dalal et al. |
| 2007/0058629 A1 | 3/2007 | Luft |
| 2007/0061397 A1 | 3/2007 | Gregorat et al. |
| 2007/0071221 A1 | 3/2007 | Allen et al. |
| 2007/0073898 A1 | 3/2007 | Shen |
| 2007/0086432 A1 | 4/2007 | Schneider et al. |
| 2007/0086582 A1 | 4/2007 | Tai et al. |
| 2007/0091878 A1 | 4/2007 | Croak et al. |
| 2007/0136413 A1* | 6/2007 | Ishikawa et al. ............. 709/200 |
| 2007/0206510 A1* | 9/2007 | Morris ................. H04B 7/2656 370/252 |
| 2007/0274219 A1* | 11/2007 | Kulkarni ............... 370/238 |
| 2008/0084859 A1* | 4/2008 | Sullivan ............... 370/342 |
| 2008/0123640 A1* | 5/2008 | Bhatia et al. ............... 370/389 |
| 2009/0323551 A1* | 12/2009 | Croak ................. H04M 3/436 370/252 |

\* cited by examiner

METHODS AND APPARATUS TO SELECT A VOICE OVER INTERNET PROTOCOL (VOIP) BORDER ELEMENT

FIELD OF THE DISCLOSURE

This disclosure relates generally to voice over Internet protocol (VoIP) networks and, more particularly, to methods and apparatus to select a VoIP border element.

BACKGROUND

Traditionally, each voice over Internet protocol (VoIP)-based devices (e.g., smart telephones, personal digital assistants, etc.) is configured with a VoIP border element (e.g., a VoIP proxy and/or a session border controller) that is responsible for routing signaling and/or media to, from and/or on behalf the VoIP device. However, when a VoIP-based device is moved (e.g., a roaming subscriber using a mobile VoIP device) and, thus, accesses a VoIP network from a different geographic location from where the VoIP device was when provisioned, a static VoIP proxy configuration may result in sub-optimal media paths, inefficient network utilization and/or increased probabilities of poor communication session quality.

DETAILED DESCRIPTION

Methods and apparatus to select a voice over Internet protocol (VoIP) border element are disclosed. A disclosed example method includes sending a first session initiation protocol (SIP) protocol message from a first voice over Internet protocol (VoIP) device, the first SIP message comprising an Internet protocol (IP) address shared by at least two VoIP border elements, and receiving a second SIP message at the first VoIP device from a second VoIP device, the second SIP message comprising a unique address for the second VoIP device, the second VoIP device to be selected based on the shared IP address.

A disclosed example voice over Internet protocol (VoIP) border element includes a network interface to receive a first session initiation protocol (SIP) protocol message, the first SIP message comprising an Internet protocol (IP) address shared by at least two VoIP border elements, and a media path redirector to respond to the first SIP message with a second SIP message, the second SIP message comprising a unique address for the VoIP border element.

A disclosed example voice over Internet protocol (VoIP) system of a first service provider includes an access border to receive a first session initiation protocol (SIP) INVITE message from a VoIP user device, the SIP INVITE message comprising a called party identifier associated with a second service provider, and a call session control function (CSCF) server to send a second SIP INVITE message in response to the first SIP INVITE message, the second SIP INVITE message comprising an Internet protocol (IP) message shared by two or more peered border elements.

In the interest of brevity and clarity, throughout the following disclosure references will be made to the example Internet protocol (IP) Multimedia subsystem (IMS) based voice over IP (VoIP) communication systems of FIGS. 1 and/or 2. Moreover, the following disclosure will be made using session initiation protocol (SIP) messages and/or SIP-based message exchanges. However, it should be understood that the methods and apparatus described herein to select VoIP border elements are applicable to other VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, and/or message exchanges.

Figure 1:
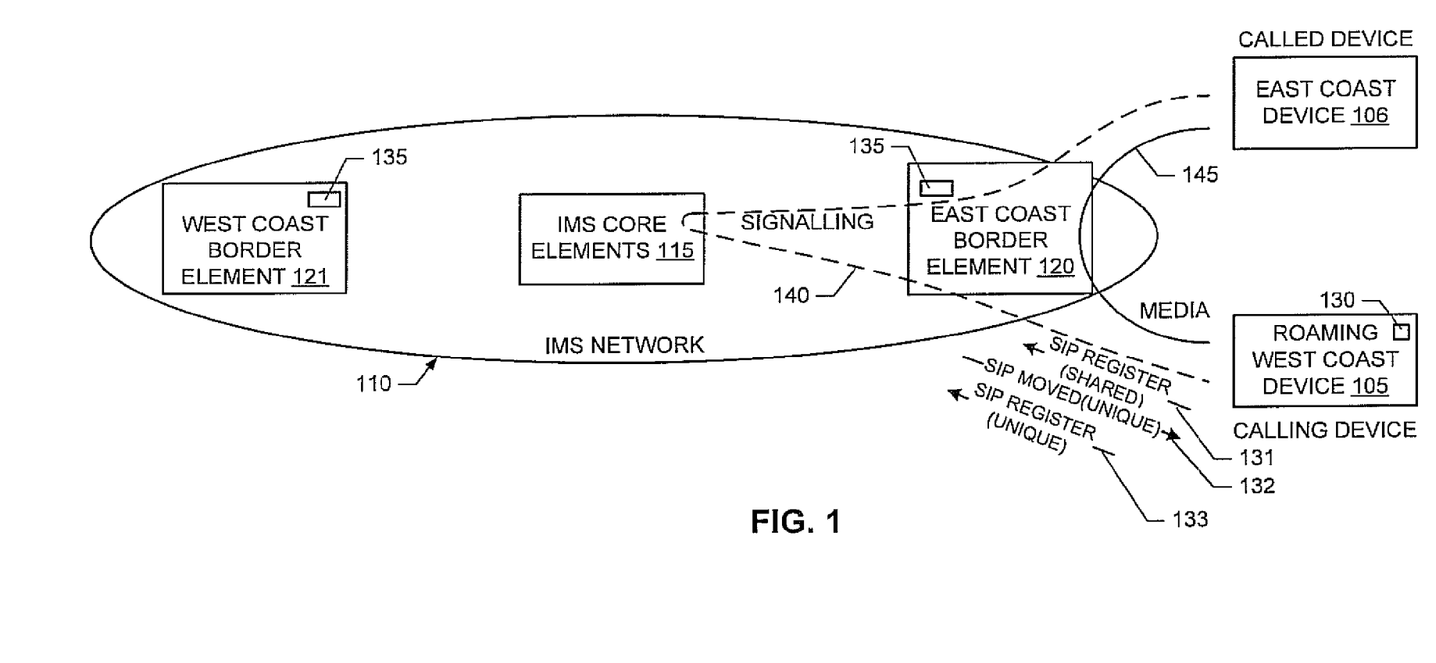
FIGS. 1 and 2 are schematic illustrations of example Internet Protocol (IP) Multimedia Subsystem (IMS) based voice over IP (VoIP) communication systems constructed in accordance with the teachings of the disclosure.
Figure 2:
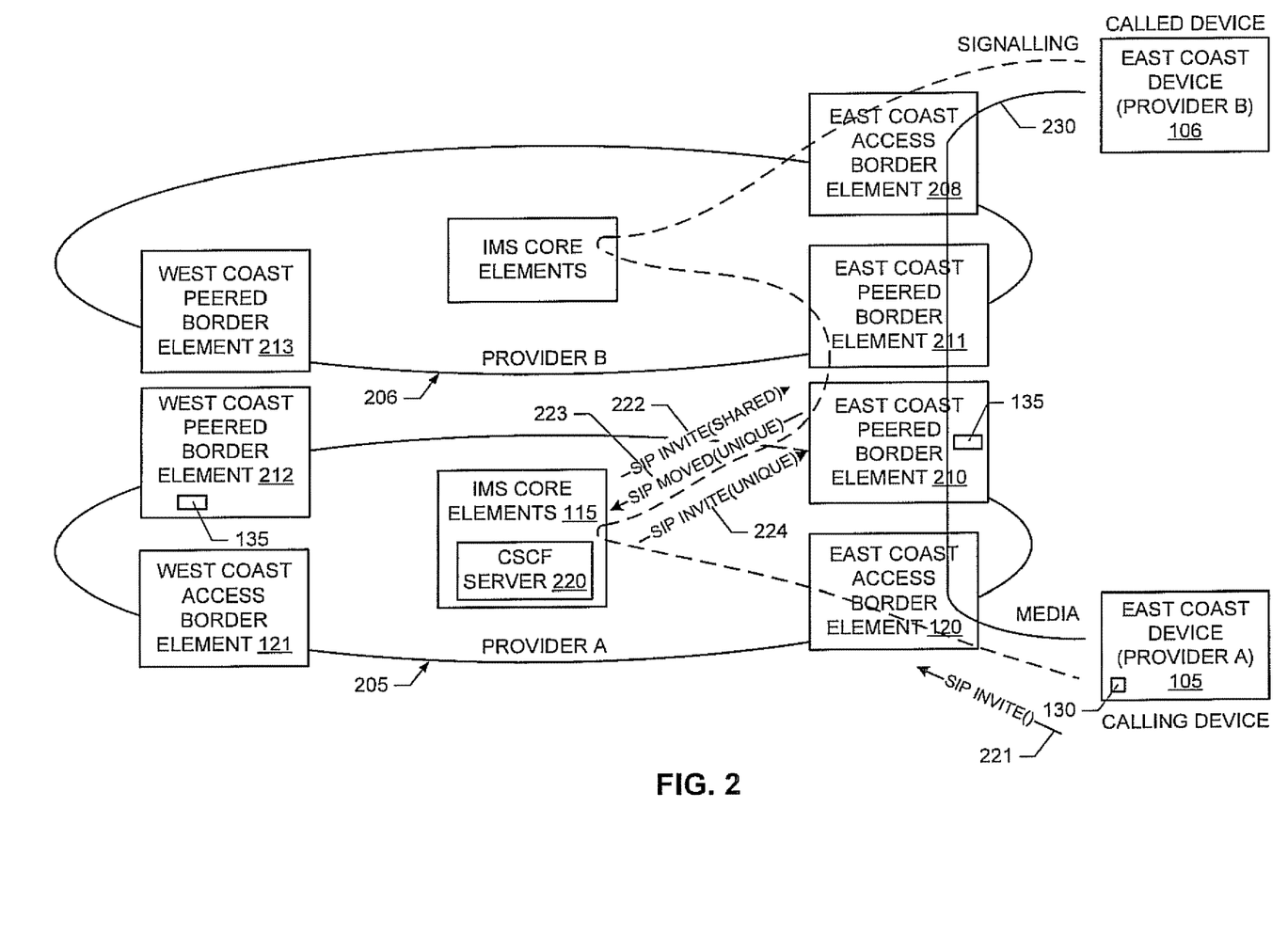

FIG. 1 is a schematic illustration of an example IMS-based VoIP communication system that includes any number and/or type(s) of VoIP user devices, two of which are designated at reference numerals 105 and 106. Example VoIP user devices 105 and 106 include, but are not limited to, an IMS (e.g., VoIP) phone, a VoIP residential gateway, a VoIP enabled personal computer (PC), a VoIP endpoint, a wireless VoIP device (e.g., a wireless-fidelity (WiFi) Internet protocol (IP) phone), a VoIP adapter (e.g., an analog telephone adapter (ATA)), a VoIP enabled personal digital assistant (PDA), and/or a VoIP kiosk. The example VoIP devices 105 and 106 of FIG. 1 may be implemented and/or be found at any number and/or type(s) of locations. Further, the VoIP devices 105 and 106 may be fixed location devices, substantially fixed location devices and/or mobile devices. For example, as shown in FIG. 1, the VoIP device 105 may be a roaming west coast device and the VoIP device 106 may be an east coast device. Moreover, the VoIP devices 105 and 106 may have equipment communicatively and/or electrically coupled to it. For example, a VoIP ATA may be coupled to a telephone, and/or a VoIP residential gateway may be coupled to a PC and/or set-top box.

To provide communication services, the example IMS based VoIP communication system of FIG. 1 includes one or more IMS networks, one of which is designated in FIG. 1 with reference numeral 110. The example IMS network 110 of FIG. 1 provides and/or enables IMS communication services (e.g., telephone services, Internet services, data services, messaging services, instant messaging services, electronic mail (email) services, chat services, video services, audio services, gaming services, voicemail, facsimile services, etc.) to the example VoIP devices 105 and 106. To implement the communication services, the example IMS network 110 of FIG. 1 includes any number and/or type(s) of IMS core elements 115. Example IMS core elements 115 include, but are not limited to, one or more of a call session control function (CSCF) server (e.g., proxy, interrogating, serving and/or otherwise), an ENUM server, a feature server, an application server, a DNS serves, a home subscriber serves (HSSs), a media gateway, a breakout gateway control function (BGCF) sever, a media gateway control function (MGCF) server, a softswitch, an IP router, an IP switch, etc.

To provide entry and/or exits points to the example IMS network 110, the example IMS network 110 of FIG. 1 includes any number of access border elements, two of which are designated at reference numerals 120 and 121. The example access border elements 120 and 121 of FIG. 1 implement boundary points between a) one or more private networks used to implement the example IMS network 110, and b) one or more public networks (e.g., the Internet), one or more private networks (e.g., home and/or corporate local area networks) and/or one or more access networks by which the example VoIP devices 105 and 106 are communicatively coupled to one or both of the example border elements 120 and 121. As shown in FIG. 1, border element 120 is an east coast border element and border element 121 is a west coast border element. In some examples, the example access border elements 120 and 121 may implement and/or carry out call admission control, denial of service control, SIP header manipulation and/or media anchoring. An example manner of implementing any or all of the example access border elements 120 and 121 of FIG. 1 is described below in connection with FIG. 3.

In many IMS networks, access border elements are geographically located with an IMS network to provide geographically separate entry and/or exit points for the IMS network. Traditionally, a VoIP device is assigned to (e.g., provisioned with a specific IP address for) a particular access border element based on its geographic locations when IMS services to the VoIP device were provisioned. For example, a VoIP device located on the west coast of the United States (a so-called west coast VoIP device) would be provisioned with the IP address of an access border element located on the west coast of the United States (a so-called west coast access border element). That is, the VoIP device provisioned as such receives its IMS network access through the west coast border element. Likewise, an east coast VoIP device would traditionally be provisioned with the IP address of an east coast access border element and would obtain its network connectivity there through.

When a traditionally provisioned VoIP device is moved (e.g., is associated with a roaming subscriber), the VoIP device still accesses the IMS network via its statically provisioned IP address of its assigned access border element. For example, a west coast VoIP device that is currently located on the east cost accesses an IMS network via its assigned west coast access border element. Further, when the roaming traditional VoIP device attempts to contact an east coast VoIP device, the signaling and/or media associated with the roaming VoIP device has to be transported cross-country from the roaming west coast VoIP device that is now roaming on the east coast to the west coast border element, and then back across the United States via the IMS network 110 to the east coast border element and the east coast VoIP device. In addition to consuming unnecessary communication resources, such traditional communication sessions may experience excessive latencies and/or provide lower communication session quality.

In contrast, in the illustrated example of FIG. 1, when the example west coast VoIP device 105 of FIG. 1 is provisioned it is configured with an IP address 130 that is shared by the west coast access border element 121 and the east coast access border element 120. An example shared IP address is an IP anycast address. When using IP anycast addresses, multiple machines (e.g., access border elements) are configured with an identical shared address, and IP routers and/or switches are configured and/or provisioned with routing tables that allow the routers and/or switches to route IP data addressed to the IP anycast address. When traffic is directed to an anycast address, the IP routers and/or switches perform IP anycast routing to select a path, from several potentially valid paths, to forward the traffic. Ultimately, data addressed to an IP anycast address is only received by one destination (e.g., one access border element). In many instances, the destination will be associated with a preferable (e.g., smallest) IP routing metric. For example, the destination that is geographically closest to a sender, that results in the least transmission latency, number of hops, a media path length, a media path cost, or a number of servers traversed, etc. may be selected.

When the example west coast VoIP device 105 attempts to, for example, register with the example IMS network 110, the west coast VoIP device 105 transmits a SIP REGISTER message 131 using the shared IP address of the access border elements 120 and 121. The IP routers and/or switches (not shown) of any public and/or private networks, which communicatively couple the VoIP device 105 to the access border elements 120 and 121, perform IP anycast routing to communicatively couple the roaming VoIP device 105 to a preferred access border element 120, 121. The IP routers and switches perform IP anycast routing to route the SIP REGISTER 131 to one of the access border elements 120, 121 (e.g., to the access border element 120, 121 that is geographically closest to the roaming VoIP device). In the illustrated example of FIG. 1, the roaming west coast VoIP device 105 is closest to the east coast border element 120 and, thus, the east coast access border element 120 receives the SIP REGISTER message 131 from the VoIP device 105 via the shared IP address. A media path redirector 135 at the example east coast border element 120 responds to the SIP REGISTER message 131 with a SIP message 132 that provides to the roaming west coast VoIP device 105 the specific and/or unique IP address of the east coast border element 120. In the illustrated example, the media path redirector 135 of FIG. 1 sends a SIP 3xx MOVED message 132 to the VoIP device 105 to provide the unique IP address of the east coast border element 120. However, any other SIP message(s) may be used. The example west coast border element 121 of FIG. 1 also includes and/or implements a media path redirector 135. However, not all access border elements need include and/or implement a media path redirector 135.

When the example roaming west coast VoIP device 105 of FIG. 1 receives the SIP 3xx MOVED message 132, the VoIP device 105 retransmits the SIP REGISTER message 133 using the received unique IP address of the east coast border element 120, and uses the unique IP address for subsequent communications with the IMS network 110. As illustrated in FIG. 1 subsequent signaling 140 associated with the VoIP device 105 are exchanged via the east coast border element 120. Moreover, the example east coast border element 120 of FIG. 1 provides a media anchoring point for a media stream 145 received from and/or directed to the west coast VoIP device 105.

As illustrated in FIG. 1, the signaling path 140 and/or the media path 145 are substantially shorter than the example communication path 125. As such, the example IMS-based VoIP communication system of FIG. 1 utilizes substantially less communication resources to implement a given communication session than traditional IMS networks. Moreover, the illustrated example of FIG. 1 implements communication sessions having lower latencies and/or higher communication session qualities.

FIG. 2 is a schematic illustration of an example IMS-based VoIP communication system that includes two VoIP service providers 205 and 206. The example IMS-based VoIP communication system of FIG. 1 illustrates a single VoIP service provider, and was discussed above to describe methods and apparatus to select a VoIP access border element. As described below, the example of FIG. 2 illustrates methods and apparatus to select a VoIP peered border element. As also described below, the example methods and apparatus of FIGS. 1 and 2 may be combined to select both VoIP access border elements and peered VoIP border elements. Because some of the example devices illustrated in FIG. 2 are identical to those discussed above in connection with FIG. 1, the descriptions of identical elements are not repeated here. Instead, identical elements are designated with identical reference numerals in FIGS. 1 and 2, and the interested reader is referred back to the descriptions presented above in connection with FIG. 1 for a complete description of those like-numbered elements. In the illustrated example of FIG. 2, the example VoIP device 105 is associated with the example VoIP service provider 205, and the example VoIP device 106 is associated with the example VoIP service provider 206. Additionally, the example service provider network 206 includes at least one access border element 208 to allow the example VoIP device 106 to be communicatively coupled to the network 206.

The example VoIP service provider networks 205 and 206 of FIG. 2 are communicatively coupled via any number of pairs of peered border elements. A first pair of peered border elements is designated in FIG. 2 with reference numerals 210 and 211, and a second pair of peered border elements is designated with reference numerals 212 and 213. Typically, the pairs of peered border elements 210, 211 and 212, 213 are located so as to provide communicatively coupling between the VoIP service provider networks 205 and 206 at geographically dispersed locations. In some examples, the peered border elements 210-213 are located at IP peering locations to facilitate deterministic IP quality-of-service. However, not all IP peering locations need to support VoIP peering. An example manner of implementing any or all of the example peered border elements 210-213 of FIG. 2 is described below in connection with FIG. 2. In general, a platform used to implement an access border element 120, 208 may be configured to, additionally or alternatively, implement a peered border element 210-213.

When a communication session is initiated from the VoIP device 105 to the VoIP device 106 associated with the service provider network 206, the service provider network 205, which is associated with the initiating VoIP device 105, must choose a peered border element 210, 212 over which to route the requested communication session. To select a preferred peered border element 210, 212, the example IMS core elements uses an IP address that is shared by each of the peered border elements 210 and 212 capable to peer with the other service provider 206. An example shared IP address is an IP anycast address. When the example VoIP device 105 sends a SIP INVITE message 221 to initiate the communication session to the VoIP device 106, the IMS core elements 115 (e.g., a CSCF server 220) determines whether the called device 106 is associated with another service provider 206. When the called device 106 is associated with another service provider 206, the IMS core elements 115 forwards a SIP INVITE message 222 to the shared IP address of the peered border elements 210 and 212. The IP routers and/or switches of the service provider network 205 (not shown), perform IP anycast routing to select a preferred peered border element 210, 212 based on the shared IP address of the peered border elements 210 and 212 (e.g., the peered border element 210, 212 that is closest to the access border element 120).

A media path redirector 135 at the selected peered border element 210, 212 responds to the SIP INVITE message 222 with a SIP message 223 that provides to the IMS core elements 115 and/or the access border element 120 the specific and/or unique IP address of the selected peered border element 210, 212. In the illustrated example, the media path redirector 135 of FIG. 2 sends a SIP 3xx MOVED message 223 to provide the unique IP address of the selected peered border element 210, 212. However, any other applicable SIP message(s) may be used. The example peered border elements 211, 213 may also include and/or implement a media path redirector 135. Moreover, the example service provider 205 may use IP anycast routing to select a peered border element 210, 212 while the peered service provider 206 does not.

When the example IMS core elements 115 of FIG. 2 receives the SIP 3xx MOVED message 223 from the selected peered border element 210, 212, the IMS core elements 115 (e.g., the CSCF server 220) retransmits the SIP INVITE message 234 using the received unique IP address of the selected peered border element 210, 212 and uses the unique IP address for subsequent communications between the calling device 105 and the called VoIP device 106. Likewise, the example access border element 120 uses the unique IP address to implement a media anchoring point for a media stream 230 between the VoIP devices 105 and 106.

To obtain the shared IP address of the peered border elements 210, 212 associated with the service provider 206 of the called device 106, the example IMS core elements 115 (e.g., the example CSCF server 220) perform an ENUM query based on a called party identifier (e.g., an E.164 telephone number) of the called party 106 to obtain a fully-qualified domain name (FQDN). The IMS core elements 115 then perform a DNS lookup based on the FQDN to obtain the shared IP address. In some examples, the IMS core elements cache an association of the shared IP address to the unique IP address returned in a subsequent SIP 3xx MOVED message. When the age of a cache entry associated with the shared IP address is less than a threshold (e.g., sixty seconds), the IMS core elements 115 forward the SIP INVITE message to the unique IP address of the peered border element 210, 212 rather than to the shared IP address. By using the cache, the number of SIP re-directions performed by the example service provider network 205 may be reduced.

The example access border elements 120 and 121 of FIG. 2 may also include a media path redirector 135 (e.g., as discussed above in connection with FIG. 1). When both the access border elements 120 and 121 and the peered border elements 210 and 212 include and/or implement media path redirectors 135, the service provider network 205 is capable to select the preferred access border element 120, 121 for the VoIP device 105, and to select a preferred peered border element 210, 212 for the VoIP device 106 of the service provider 206. However, the IP address used to select the preferred access border element 120, 121 will be different from the IP address used to select the preferred peered border element 210, 212.

While example IMS-based VoIP communication systems have been illustrated in FIGS. 1 and 2, the devices, networks, systems, servers and/or processors illustrated in FIGS. 1 and 2 may be combined, divided, re-arranged, eliminated and/or implemented in any way. For example, it will be readily appreciated by persons of ordinary skill in the art that the example border elements 120, 121, the example IMS core elements 115, the example media path redirectors 135, the example peered border elements 210-213 illustrated in FIGS. 1 and 2 are logical entities. They may, therefore, be implemented separately and/or in any combination using, for example, machine accessible instructions executed by one or more computing devices and/or computing platforms (e.g., the example processing platform 600 of FIG. 6). Further, the example VoIP devices 105 and 106, the example border elements 120, 121, the example IMS core elements 115, the example media path redirectors 135, the example peered border elements 210-213 and/or, more generally, the example IMS networks 110, 205 and/or 206 may be implemented by hardware, software, firmware and/or any combination of hardware, software and/or firmware. Further still, the example IMS-based VoIP communication system and/or the example IMS networks 110, 205 and/or 206 may include additional devices, servers, systems, networks, gateways, portals, and/or processors in addition to, or instead of, those illustrated in FIGS. 1 and 2, and/or may include more than one of any or all of the illustrated devices, servers, networks, systems, gateways, portals, and/or processors.

Figure 3:
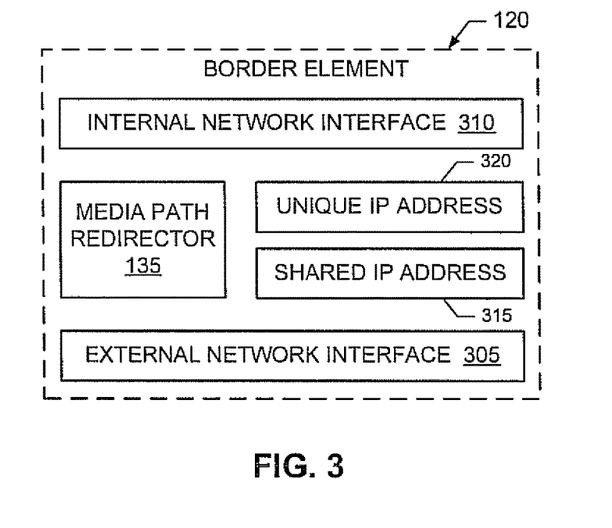
FIG. 3 illustrates an example manner of implementing any of the example border elements of FIGS. 1 and/or 2.

FIG. 3 illustrates an example manner of implementing any or all of the example access border elements 120, 121 and/or any or all of the example peered border elements 210, 211, 212 and/or 213 of FIGS. 1 and/or 2. While any of the example border elements 120, 121, 210-213 may be represented by FIG. 3, for ease of discussion, the example device of FIG. 3 will be referred to as border element 120. To communicate with devices outside of an IMS network (e.g., with a VoIP device and/or with a peered border element of another IMS network), the example border element 120 of FIG. 3 includes any type external network interface 305. To communicate with devices located and/or implemented within the IMS network (e.g., the example IMS core elements 115 and/or a peered border element of the IMS network), the example border element 120 of FIG. 3 includes any type of internal network interface 310. The example interfaces 305 and 310 operate in accordance with any of the Institute of Electrical and Electronics Engineers (IEEE) 802.3x (a.k.a. Ethernet) family of standards.

As illustrated in FIG. 3, the example border element 120 is provisioned with a shared IP address 315 and a unique IP address 320. As described above, the shared IP address 315 is shared with other similarly configured border elements. For example, all access border elements of a particular IMS network may be provisioned with the same shared IP address 315. Likewise, all peered border elements capable to perform VoIP peering with a particular VoIP service provider may be provisioned with the same shared IP address 315. If a border element is configured to operate as both an access border element and a peered border element, it may be provisioned with respective shared IP addresses 315. The example unique IP address 320 of FIG. 3 is specific to the border element 120 and, thus, may be used to address and/or direct IP data directly to the border element 120.

To re-direct media paths, the example border element 120 of FIG. 3 includes a media path redirector 135. When the example media path redirector 135 of FIG. 3 receives a SIP message (e.g., a SIP REGISTER and/or a SIP INVITE message) addressed to its shared IP address 315, the media path redirector 135 responds with a SIP message that provides the example unique IP address 320. An example SIP message to provide the unique IP address 320 is the SIP 3xx MOVED message. However, any applicable SIP message(s) may be used. Example machine accessible instructions that may be used to implement the example media path redirector 135 are described below in connection with FIG. 5.

While an example manner of implementing any or all of the example access border elements 120, 121 and/or any or all of the example peered border elements 210, 211, 212 and/or 213 of FIGS. 1 and/or 2 has been illustrated in FIG. 3, one or more of the interfaces, data structures, elements, processes and/or devices illustrated in FIG. 3 may be combined, divided, re-arranged, omitted, eliminated and/or implemented in any other way. For example, the media path redirector 135 may be implemented by modifying and/or enhancing a traditional and/or existing border element by the addition of one or more functions of the example media path redirector 135. Further, the example interfaces 305 and 310, the example media path redirector 135 and/or, more generally, the example border element 120 of FIG. 3 may be implemented by hardware, software, firmware and/or any combination of hardware, software and/or firmware. Further still, a border element may include interfaces, data structures, elements, processes and/or devices instead of, or in addition to, those illustrated in FIG. 3 and/or may include more than one of any or all of the illustrated interfaces, data structures, elements, processes and/or devices. For example, the S-CSCF 145 may include and/or implement one or more additional capabilities, such as call admission control, denial of service handling, and/or SIP message header manipulation.

Figure 4:
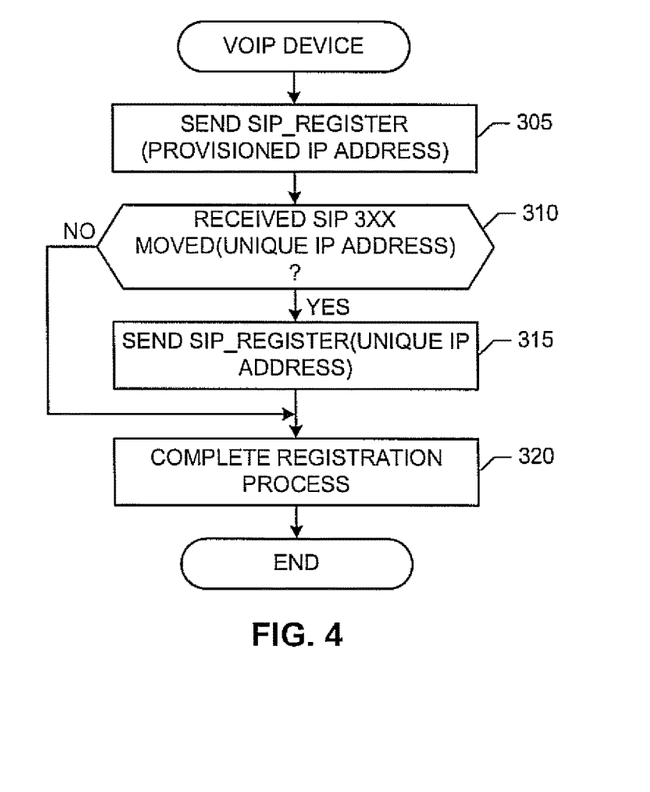
FIG. 4 is a flowchart representative of example machine accessible instructions that may be executed by, for example, a processor to implement any or all of the example voice user devices of FIGS. 1 and/or 2.
Figure 5:
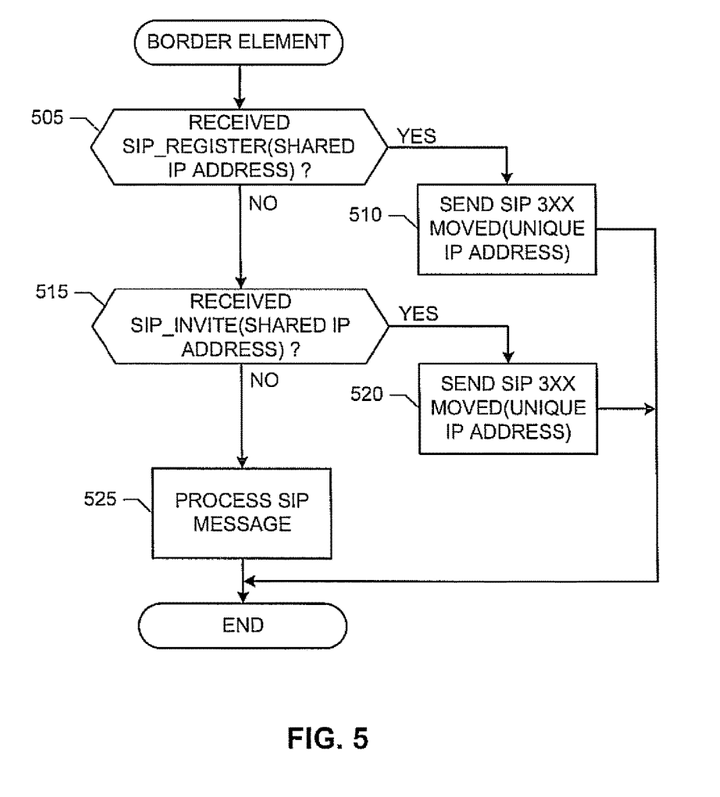
FIG. 5 is a flowchart representative of example machine accessible instructions that may be executed, for example, a processor to implement any or all of the example border elements of FIGS. 1, 2 and/or 3.

FIG. 4 illustrates example machine accessible instructions that may be executed to implement any or all of the example VoIP devices 105 and 106 (e.g., a SIP user agent of a VoIP device) of FIGS. 1 and/or 2. FIG. 5 illustrates example machine accessible instructions that may be executed to implement any or all of the example access border elements 120, 121 and/or any or all of the example peered border elements 210, 211, 212 and/or 213 of FIGS. 1 and/or 2.

The example machine accessible instructions of FIGS. 4 and/or 5 may be carried out by a processor, a controller and/or any other suitable processing device. For example, the example machine accessible instructions of FIGS. 4 and/or 5 may be embodied in coded instructions stored on a tangible medium such as a flash memory, a ROM and/or RAM associated with a processor (e.g., the example processor 605 discussed below in connection with FIG. 6). Alternatively, some or all of the example machine accessible instructions of FIGS. 4 and/or 5 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIGS. 4 and/or 5 may be implemented manually or as any combination of any of the foregoing techniques, for example, any combination of firmware, software, discrete logic and/or hardware. Further, although the example machine accessible instructions of FIGS. 4 and 5 are described with reference to the flowcharts of FIGS. 4 and 5, persons of ordinary skill in the art will readily appreciate that many other methods of implementing the example operations of FIGS. 4 and 5 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 4 and/or 5 may be carried out sequentially and/or carried out in parallel by, for example, separate processing threads, processors, devices, discrete logic, circuits, etc.

The example machine accessible instructions of FIG. 4 begin when a VoIP device (e.g., any of the example VoIP devices 105 and/or 106 of FIGS. 1 and/or 2) is, for example, powered-on and/or restarted. The VoIP device (e.g., a SIP user agent of the VoIP device sends a SIP REGISTER message to its provisioned access border element IP address (block 405). As described above, the provisioned IP address may be an IP address shared by one or more access border elements (e.g., the example shared IP address 130), or a unique IP address of a particular access border element. If the SIP user agent receives a SIP message containing a unique IP address of an access border element (e.g., a SIP 3xx MOVED message) (block 310), the SIP user agent sends another SIP REGISTER message to the unique IP address (block 315). The SIP user agent completes the registration process (block 320), and control exits from the example machine accessible instructions of FIG. 4.

Returning to block 310, if the SIP user agent does not receive a SIP message containing a unique IP address (block 310), control proceeds to block 320 without resending the SIP REGISTER message. The SIP user agent completes the registration process (block 320), and control exits from the example machine accessible instructions of FIG. 4.

The machine accessible instructions of FIG. 5 begin when a border element (e.g., any of the example access border elements 120 and 121 and/or any of the example peered border elements 210-213 of FIGS. 1 and/or 2) receives a SIP message (e.g., from a VoIP device and/or an IMS core element, such as a CSCF server). If the received SIP message is a SIP REGISTER message addressed to a shared IP address (e.g., the example shared IP address 315 of FIG. 3) of the border element (block 505), the border element (e.g., the example media path redirector 135) responds by sending a SIP 3xx MOVED message that contains a unique IP address (e.g., the example unique IP address 320) (block 510). Control then exits from the example machine accessible instructions of FIG. 5.

If the received SIP message is a SIP INVITE message addressed to a shared IP address (e.g., the example shared IP address 315 of FIG. 3) of the border element (block 515), the border element (e.g., the example media path redirector 135) responds by sending a SIP 3xx MOVED message that contains a unique IP address (e.g., the example unique IP address 320) (block 520). Control then exits from the example machine accessible instructions of FIG. 5.

If the receive SIP message is not a SIP INVITE or a SIP REGISTER addressed to a shared IP address (block 515), the border element performs appropriate processing and/or handling of the received SIP message (block 525). Control then exits from the example machine accessible instructions of FIG. 5.

Figure 6:
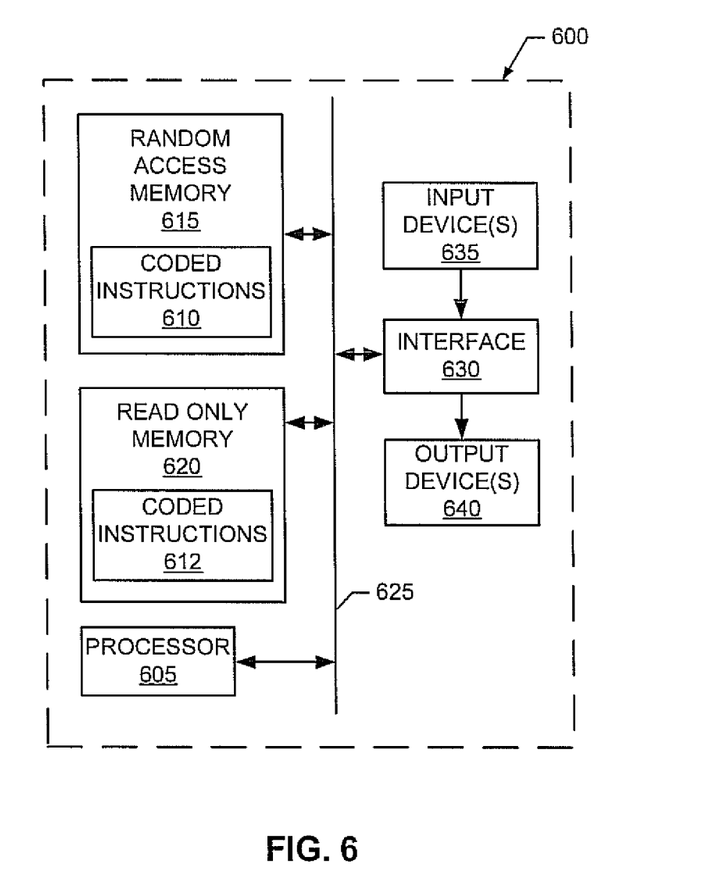
FIG. 6 is a schematic illustration of an example processor platform that may be used and/or programmed to carry out the example machine accessible instructions of FIGS. 4 and/or 5 to implement any of all of the example methods and apparatus described herein.

FIG. 6 is a schematic diagram of an example processor platform 600 that may be used and/or programmed to implement all or a portion of any or all of the example VoIP devices 105 and/or 106, and/or any or all of the example border elements 120, 121 and/or 210-213 of FIGS. 1 and/or 2. For example, the processor platform 600 can be implemented by one or more general purpose processors, processor cores, microcontrollers, etc.

The processor platform 600 of the example of FIG. 6 includes at least one general purpose programmable processor 605. The processor 605 executes coded instructions 610 and/or 612 present in main memory of the processor 605 (e.g., within a random-access memory (RAM) 615 and/or a read-only memory (ROM) 620). The processor 605 may be any type of processing unit, such as a processor core, a processor and/or a microcontroller. The processor 605 may execute, among other things, the example protocol message exchanges and/or the example machine accessible instructions of FIGS. 4 and/or 5 to implement the example methods and apparatus described herein.

The processor 605 is in communication with the main memory (including a ROM 620 and/or the RAM 615) via a bus 625. The RAM 615 may be implemented by DRAM, SDRAM, and/or any other type of RAM device, and ROM may be implemented by flash memory and/or any other desired type of memory device. Access to the memory 615 and 620 may be controlled by a memory controller (not shown).

The processor platform 600 also includes an interface circuit 630. The interface circuit 630 may be implemented by any type of interface standard, such as an external memory interface, serial port, general purpose input/output, etc. One or more input devices 635 and one or more output devices 640 are connected to the interface circuit 630. The input devices 635 and/or output devices 640 may be used to, for example, implement the example interfaces 305 and 310 of FIG. 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   sending a first session initiation protocol message from a first voice over Internet protocol device at a first time, the first session initiation protocol message including an Internet protocol address shared by at least two border elements; and
   receiving a second session initiation protocol message at the first voice over Internet protocol device from a first one of the at least two border elements at a second time, the first border element being selected based on the shared Internet protocol address at the first time, the second session initiation protocol message including
   a unique address for the first border element in place of the shared address when the second session initiation protocol message occurs during a first threshold period after the first time, and
   the second session initiation protocol message including the shared address when the second session initiation protocol message occurs after the first threshold period.

2. A method as defined in claim 1, further including performing Internet protocol anycast routing to select the first one of the at least two border elements.

3. A method as defined in claim 1, further including selecting the first border element to reduce a latency associated with a communication path requested via the first session initiation protocol message.

4. A method as defined in claim 1, wherein the first border element is selected based on a minimum routing metric.

5. A method as defined in claim 4, wherein the minimum routing metric includes at least one of a geographic distance, a media path length, a media path cost, or a number of servers traversed.

6. A method as defined in claim 1, wherein the first session initiation protocol message includes a SIP REGISTER message.

7. A method as defined in claim 1, further including registering with an Internet protocol Multimedia Sub-system network based on the unique address.

8. A method as defined in claim 1, wherein the first session initiation protocol message includes a SIP INVITE message.

9. A method as defined in claim 1, further including initiating a communication session to a called party based on the unique address.

10. A method as defined in claim 1, wherein the second session initiation protocol message includes a SIP 3xx MOVED message.

11. A method as defined in claim 1, wherein the first voice over Internet protocol device includes a voice over Internet protocol endpoint, and the first one of the at least two border elements includes a voice over Internet protocol access border gateway.

12. A method as defined in claim 1, wherein the first voice over Internet protocol device includes an access border element, and the first one of the at least two border elements includes a voice over Internet protocol peered border gateway.

13. A method as defined in claim 1, wherein the shared Internet protocol address includes an Internet protocol anycast address.

14. A method as defined in claim 1, further including:
   querying a telephone number mapping database to obtain a fully qualified domain name associated with a called device; and
   querying a domain name service server to obtain the shared Internet protocol address based on the fully qualified domain name.

15. An apparatus comprising:
   a memory having machine readable instructions stored thereon; and
   a processor to execute the instructions to:
      respond to a first session initiation protocol message sent at a first time with a second session initiation protocol message at a second time, the first session initiation protocol message including an Internet protocol address shared by at least two border elements, the second session initiation protocol message including
      a unique address for a first one of the at least two border elements in place of the shared Internet protocol address when the second session initiation protocol message occurs during a first threshold period after the first time, and
      the second session initiation protocol message including the shared address when the second session initiation protocol message occurs after the first threshold period.

16. An apparatus as defined in claim 15, wherein the second session initiation protocol message includes a SIP 3xx MOVED message.

17. An apparatus as defined in claim 15, wherein the shared Internet protocol address includes an Internet protocol anycast address.

18. An apparatus as defined in claim 15, wherein one of the at least two border elements include an access border element.

19. An apparatus as defined in claim 15, wherein one of the at least two border elements include a peered border element.

20. An apparatus as defined in claim 15, further including a second network interface to a private Internet protocol network, and the network interface includes an interface to a public Internet protocol network.

21. A tangible machine readable storage device comprising instructions that, when executed, cause a machine to, at least:
   send a first session initiation protocol message at a first time, the first session initiation protocol message including an Internet protocol address shared by at least two border elements; and
   receive a second session initiation protocol message from a first one of the at least two border elements at a second time, the second session initiation protocol message including
   a unique address for the first border element in place of the shared address when the second session initiation protocol message occurs during a first threshold period after the first time, and the second session initiation protocol message including the shared address when the second session initiation protocol message occurs after the first threshold period.

22. A tangible machine readable storage device as defined in claim 21, wherein the first session initiation protocol message includes at least one of a SIP REGISTER message or a SIP INVITE message, and the second session initiation protocol message includes a SIP 3xx MOVED message.

23. A tangible machine readable storage device as defined in claim 21, wherein the instructions, when executed, cause the machine to register with an Internet protocol Multimedia Sub-system network based on the unique address.

24. A tangible machine readable storage device as defined in claim 21, wherein the first voice over Internet protocol device includes a voice over Internet protocol endpoint, and the first border element includes a voice over Internet protocol access border gateway.

25. A tangible machine readable storage device as defined in claim 21, wherein the shared Internet protocol address includes an Internet protocol anycast address.

26. A tangible machine readable storage device as defined in claim 21, wherein the instructions, when executed, cause the machine to:
 query a telephone number mapping database to obtain a fully qualified domain name associated with a called device; and
 query a domain name service server to obtain the shared Internet protocol address based on the fully qualified domain name.

* * * * *